US007343824B2

(12) United States Patent
Gao

(10) Patent No.: US 7,343,824 B2
(45) Date of Patent: Mar. 18, 2008

(54) VARIABLE TORQUE-LIMITING DRIVER

(75) Inventor: Hua Gao, Fox Point, WI (US)

(73) Assignee: Bradshaw Medical, Inc., Kenosha, WI (US)

( * ) Notice: Subject to any disclaimer, the term of this patent is extended or adjusted under 35 U.S.C. 154(b) by 110 days.

(21) Appl. No.: 11/471,065

(22) Filed: Jun. 20, 2006

(65) Prior Publication Data

US 2007/0289391 A1 Dec. 20, 2007

(51) Int. Cl.
*G01L 5/24* (2006.01)

(52) U.S. Cl. ......................... 73/862.21; 73/847; 81/58; 81/467

(58) Field of Classification Search .................. 73/847, 73/862.08, 862.191, 862.21, 862.23; 81/58, 81/467, 473
See application file for complete search history.

(56) References Cited

U.S. PATENT DOCUMENTS

| | | | |
|---|---|---|---|
| 1,566,553 A | 12/1925 | Maisch | |
| 1,860,871 A | 5/1932 | Pouliot | |
| 2,332,971 A | 10/1943 | Johnson | |
| 2,802,354 A | 8/1957 | Bohnhoff et al. | |
| 3,168,944 A | 2/1965 | Livermont | |
| 3,277,670 A | 10/1966 | Bent | |
| 3,277,671 A | 10/1966 | Winstone et al. | |
| 3,305,058 A | 2/1967 | Orwin et al. | |
| 3,613,751 A | 10/1971 | Juhasz | |
| 3,653,226 A | 4/1972 | Westbury | |
| 3,702,546 A | 11/1972 | Schnepel | |
| 3,942,337 A | 3/1976 | Leonard et al. | |
| 4,041,729 A | 8/1977 | Bilz | |
| 4,653,359 A * | 3/1987 | Liao | 81/475 |
| 4,668,206 A | 5/1987 | Fukumoto | |
| 4,712,456 A | 12/1987 | Yuan | |
| 5,035,311 A | 7/1991 | Girguis | |
| 5,054,588 A | 10/1991 | Thorp et al. | |
| 5,129,293 A * | 7/1992 | Larson et al. | 81/483 |
| 5,156,244 A | 10/1992 | Pyles et al. | |
| 5,356,350 A | 10/1994 | Schreiber | |
| 5,383,818 A | 1/1995 | Lessat-Kaupat et al. | |
| 5,505,676 A | 4/1996 | Bookshar | |
| 5,983,635 A * | 11/1999 | Kato et al. | 60/487 |
| 6,132,435 A | 10/2000 | Young | |
| 6,640,674 B1 | 11/2003 | Rinner et al. | |
| 6,990,877 B1 | 1/2006 | Wu | |
| 7,032,476 B2 * | 4/2006 | Lin | 81/58.3 |
| 7,114,824 B2 * | 10/2006 | Picone | 362/119 |
| 7,243,581 B1 * | 7/2007 | Gao | 81/473 |
| 7,284,451 B2 * | 10/2007 | Cupif et al. | 73/862.23 |
| 2007/0101831 A1 * | 5/2007 | Rinner et al. | 81/58.4 |

* cited by examiner

*Primary Examiner*—Edward Lefkowitz
*Assistant Examiner*—Freddie Kirkland, III
(74) *Attorney, Agent, or Firm*—Ryan Kromholz & Manion, S.C.

(57) ABSTRACT

An adjustable, torque-limiting driver for a tool having a radially extending handle that houses a cam member and a pair of plungers. The plungers are biased against the housing and provide variable resistance for the cam member. The arrangement of the cam member and the plungers reduces the wear on the various parts of the driver and extends the life of the driver.

20 Claims, 9 Drawing Sheets

VARIABLE TORQUE-LIMITING DRIVER

BACKGROUND OF THE INVENTION

The present invention relates to drivers and devices for delivering limited or regulated amounts of torque upon an object and, more particularly, to drivers that are capable of limiting the amount of torque delivered at varying settings.

Screwdrivers, wrenches and the like have been developed to allow for varying degrees of torque to be delivered upon an object. These devices allow for different tensions or torques to be built into a torque-limiting device. Generally, such drivers use springs in connection with a tensioning or biasing device to adjust or vary the amount of torque being delivered to an object. In certain devices and drivers, such as devices used in the medical field, these devices must be able to exert a large amount of force, while retaining a high level of precision. The large amount of force delivered by these devices tends to put a large amount of stress on the springs, which diminishes the strength of the spring, thereby reducing the precision of the spring.

Likewise, drivers and the like may be required to deliver differing amounts of torque at different times. That is, the same driver may be required to deliver a first amount of torque for a first procedure or step and a second amount of torque for a second amount of torque for a second procedure or step. These different steps still require precision. It is essential that one may be able to change from one setting to another accurately without losing precision. That is, the biasing means used in the devices should remain accurate even after several adjustments between varying tension settings. Previous designs that use springs, as discussed above, tend to wear after some use, thereby reducing the accuracy of the device.

Generally, prior art drivers use balls or ball bearings placed between to clutch plates or between a cam plate and a drive plate that work together with the springs to assist in the adjustment of the drivers. As the plates rotate relative to one another, the bearings slide within a grooved slot formed by the two plates, with the slot having varying depths. As torque is increased with the driver, the ball bearings will slide along the surface of the groove. When the torque becomes too much, the bearings will be forced into an area that prevents the two plates from working together with one another, thus preventing any further torque to be delivered to the driven object.

While able to limit the amount of torque being delivered, the drivers can take a lot of abuse, especially on the bearings themselves. Especially with medical applications, the amount of torque needed to be delivered can be several hundreds of pounds of pressure. When these devices trigger a torque cut-off or maximum torque level, the two plates will sandwich the bearings, exerting a large amount of pressure on the bearings. This smashing action of the bearings can cause damage to the bearings, which results in the effectiveness of the driver being diminished. This is not desirous for equipment requiring a high-level of precision, especially when the equipment can be rather expensive.

Thus, it would be advantageous to design a wrench or driver that could deliver differing amounts of torque at a high level of precision, which also delivers such precise torque levels consistently over many successive procedures.

Likewise it would be advantageous to develop a driver that could be adjusted between various torque levels, without losing any accuracy or precision after several uses or adjustments.

SUMMARY OF THE INVENTION

The present invention comprises an adjustable, torque-limiting driver for a tool having a radially extending handle that houses a cam member and a pair of plungers. The plungers are biased against the housing and provide variable resistance for the cam member. The arrangement of the cam member and the plungers reduces the wear on the various parts of the driver and extends the life of the driver.

The handle has a first end, a second end, and an intermediate area. A cam member located in the intermediate area has a curvilinear surface, with the cam member being movable between an engaged position and an override position. A first plunger member and biasing means is located in said first end of said housing, with a first rolling member located between the first plunger member and the cam member. The first rolling member and the cam member form a gap therebetween when the cam member is in the override position.

A second plunger member is located in the second end of the housing, with the second plunger member being movable from a first position to a second position. The second plunger member is adjustable, so that a second rolling member can be moved to engage and interact with the cam member. The arrangement provides an easy to use tool driver that will minimize unnecessary force on the various elements of the driver, thereby extending the life of the driver.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
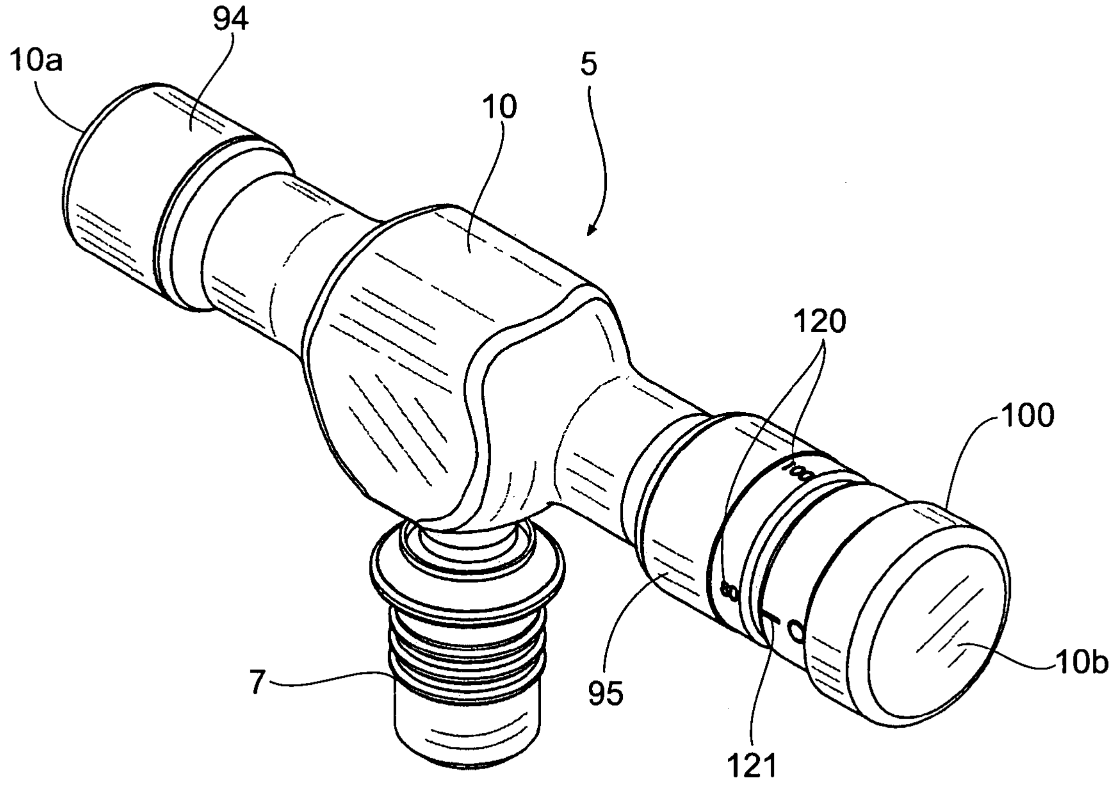
FIG. 1 is a perspective of a variable torque-limiting driver in accordance with the present invention.

FIG. 1 is a perspective view of an adjustable torque-limiting driver 5 according to the present invention. The driver 5 comprises a handle 10, which has a first end 10*a* having a stationary cap 94 and a second end 10*b* having an adjustment knob 100 that interacts with a second cap 95. A plurality of markings 120 are located on the second cap 95 to note various levels of torque or pressure that will be exerted by the driver 5. An indicator mark 121 located on the knob 100 allows the user to identify and choose a precise amount of torque to be delivered by the driver 5. An adaptor 7 is located in an intermediate area of the handle 10, preferably located centrally of the handle 10, to allow the driver 5 to be attached to various screwdrivers, wrenches, or other similar tools.

Figure 2:
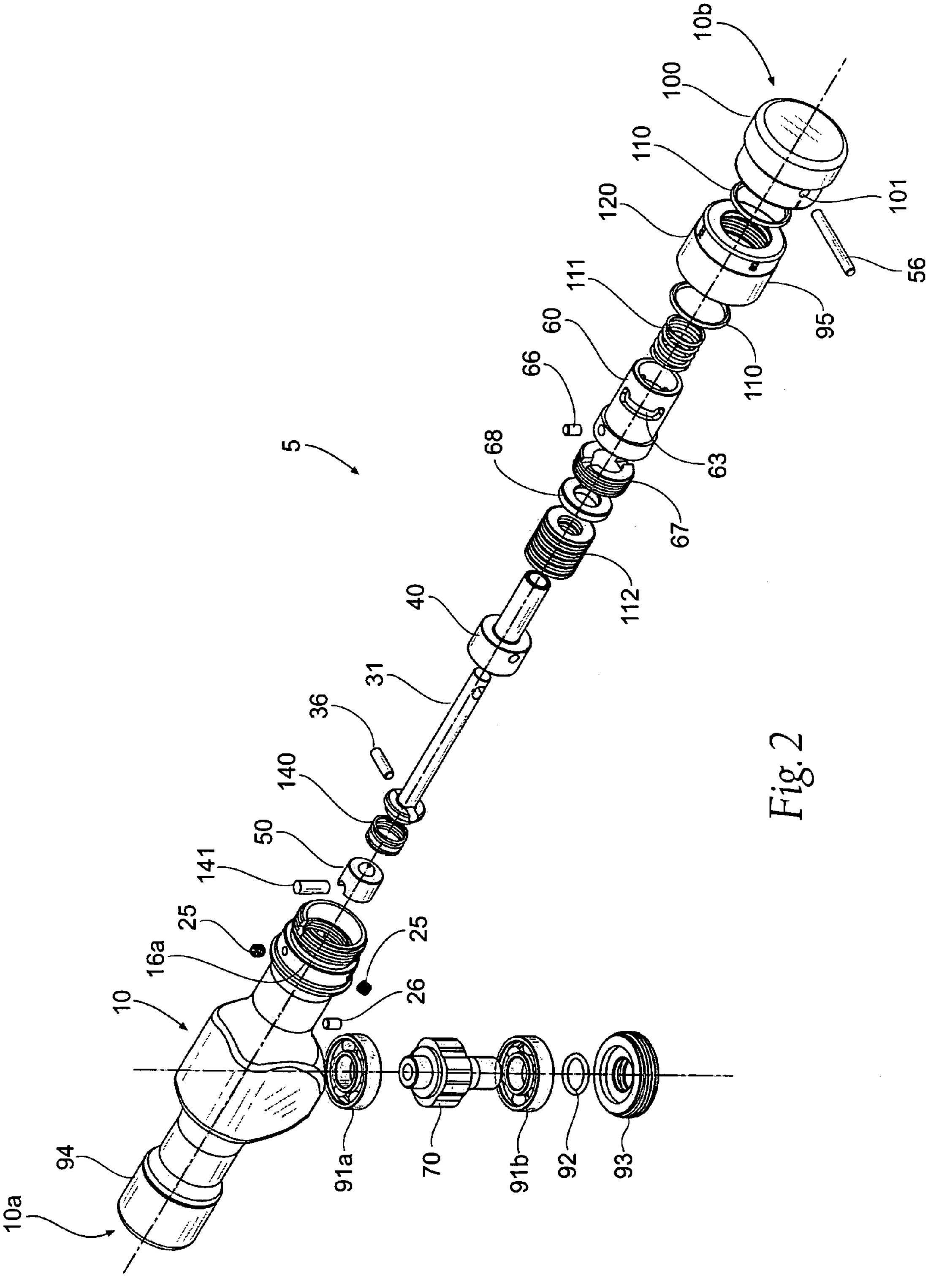
FIG. 2 is an exploded view of the driver of FIG. 1.

FIG. 2 provides an exploded view of the driver 5. The handle 10 further comprises a cam member 70 that provides the main driving device or structure for limiting the amount of torque delivered by the driver 5. The cam member 70 generally sits between a bearing 91*a* and a bearing 91*b*, which provides the cam member with proper axial alignment. The bearings 91*a*, 91*b*, preferably ball bearings, are arranged to hold the cam member 70 in a position substantially perpendicular to the handle 10 so that proper and true torque is delivered by the driver 5. The arrangement reduces friction and play within the driver 5, thereby providing a more precise and efficient assembly compare to prior art drivers. The cam member 70 and the bearings 91*a*, 91*b* are held within the handle 10 with a screw 93. A gasket or o-ring 92 provides a seal between the bearing 91*b* and the screw 93. The shape and design of the cam member 70 will be discussed further with respect to the following drawings, particularly FIGS. 17-22.

Still referring to FIG. 2, the second end 10*b* of the handle 10 is shown in an exploded arrangement. A locking pin 26 is shown, which will secure the driver 5 in any of the various torque delivery positions. The handle 10 further comprises a threaded housing member 16*a* that generally will hold the various components of the second end 10*b* within the handle 10. A plurality of set screws 25 will assist in locking the housing member 16*a* to the second cap 95. A plunger 50 and a spring 140 are inserted into the housing member 16*a*. The plunger 50 interacts with an adjustment bar 31, which will be more evident with respect to FIGS. 3 and 4. A second plunger 40 will be inserted into the housing member 16*a* around and the adjustment bar or shaft 31, with the plunger 40 and the shaft 31 being capable of interaction by way of a pin 36 that will be inserted into the plunger 40 and a hole 33 located on the shaft.

Referring further to FIG. 2, the plunger 40 supports a spring 112, preferably a Belleville spring, that will provide tension between the plunger 40 and a locking mechanism 60. The plunger 40 also supports a spacer 68 and an adjustment screw 67. The adjustment screw 67 is coupled to the locking mechanism 60 by way of a locking pin 66. The plunger 40 and the locking mechanism 60 further contribute to the overall precision of the driver 5. A second helical spring 111 is housed within the locking mechanism and pushes the pin 66 into the notch 63 of the locking mechanism so that the knob 100 will be locked in a predetermined position. A pair of gaskets or o-rings 110 further insure the various elements of the driver 5 are properly arranged and secured. As is understood, more or fewer springs, gaskets, or seals, or different types of springs, gaskets, or seals may be used in the present invention and still fall within the scope of the invention. The knob 100 is attached to the shaft 31 by way of a pin 56 inserted into a hole 101 located on the knob 100 and a hole 35 located on the shaft 31. As will be more evident with respect to FIGS. 3 and 4, turning of the knob 100 allows the device to deliver differing amounts of torque by precisely adjusting the biasing means of the driver. The overall arrangement of the second end 10*b* and the interaction of the individual elements contribute to the accurate operation and adjustment of the driver 5.

Figure 3:
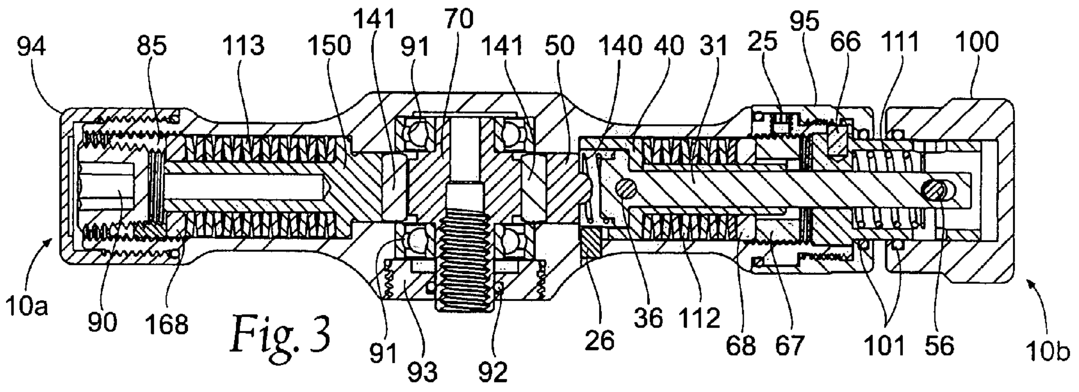
FIG. 3 is a cross-sectional view of a driver according to the present invention in a first position.
Figure 4:
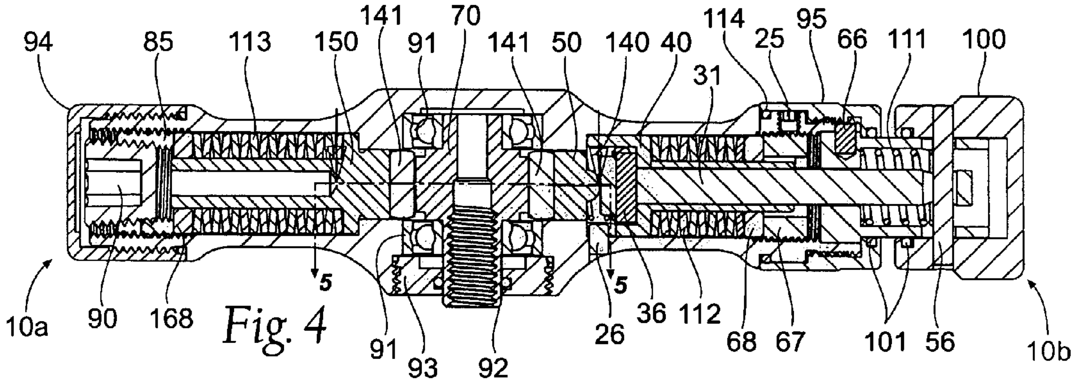
FIG. 4 is a cross-sectional view of the driver in FIG. 3 in a second position.

FIGS. 3 and 4 further illustrate the interaction of the elements of the driver 5 in various positions. FIG. 3 shows the driver 5 in a first position. The adjustment bar 31 is not engaged with the plunger 50. When the knob 100 is turned to a second position shown in FIG. 4, the adjustment bar 31 is now in engaged with the plunger 50. The first end 10*a* of the handle 10 houses a second plunger 150, which is generally in an interacting relationship with the cam member 70 in both the first position and the second position. The term interactable refers to a position whereby the plunger or plungers are capable of providing resistance to the cam member 70, which includes arrangements where the plungers and the cam member 70 may not be in direct physical contact, as shown and discussed in FIG. 5. The plunger 150 sits within the first end 10*a* with a spring 113 surrounding the plunger 150 and providing the necessary tension and compression force for the plunger 50 to adequately interact with cam member 70. A spacer 168 sits between the spring 112 and a locking screw 85. These elements are held in place within the first end 10*a* by the cap 94 being threaded onto the locking screw 85. A plug 90 is also located within the first end 10*a* to keep the plunger 150 properly positioned within the handle 10 and insure the plunger 150 provides precise and accurate tension to the cam member 70.

Still referring to FIG. 3, the plunger 40 is shown arranged around the adjustment bar 31 and the pin 36. The spring 140 biases plunger 40 and the adjustment bar 31 against the housing, with the spring 112 providing further biasing means. The spring 140 pushes the plunger 40 and the roller 141 to engage the cam member 70. The spring 112 sits around the adjustment bar 31, between the adjustment screw 67 and the end of the plunger 40. The set screws 25 further hold the adjustment screw 67 in place with respect to the locking mechanism 60, which in turn is held in place by the locking pin 66. The spring 111 is housed within the locking mechanism 60, with the spring 111 providing further biasing means between the knob 100 and the locking mechanism 60. As previously stated, the knob 100 and the adjustment shaft 31 are held together by way of the pin 56.

Figure 5:
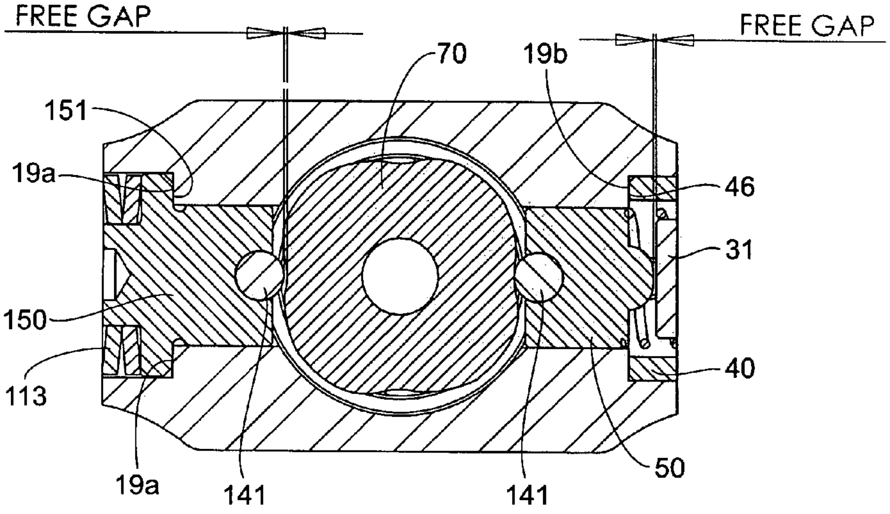
FIG. 5 is a close-up sectional view of the area of the driver of FIG. 3 taken along line 5-5 of FIG. 4.

FIG. 4 provides a similar arrangement to that shown in FIG. 3, except, as previously stated, the plunger 50 and the adjustment bar 31 are now in an engaged position. The knob 100 is turned 90° from the position shown in FIG. 3. As the knob 100 is turned or twisted, the various springs are compressed, thereby forcing the adjustment bar 31 and the plunger 50 into engagement, which results in the plunger 50 actively providing resistance to the cam member 70. This is shown clearly in FIG. 5, which provides a close-up of FIG. 4 taken along the line 5-5 of FIG. 4. As shown, both the plunger 50 and the plunger 150 are in an interacting with the cam member 70. The plunger 150 has a surface 151 that rests upon a surface 19*a* of the handle 10, with the plunger 150 being held in place and biased against the surface 19*a* by the spring 113 (see FIGS. 3 and 4). Similarly, a front surface 46 of the plunger 40 rests upon a surface 19*b*. It should be noted that the arrangement of the plunger 150 and the cam member 70 are normally in an engaged arrangement. The first end 10*a* (FIGS. 3 and 4) does not have adjustment means as does the second end 10*b*. Thus, the plunger 150 always interacts with the cam 70, thereby providing a second level of tension for the driver 5, even when the plunger 50 is not engaged with the cam member 70. As shown in FIG. 5, a gap is located therebetween the rolling member 141 connected to plunger 150 and the cam member 70 when the plunger 150 is in an override position. It should be understood that it may be possible to have adjustment means to regulate the resistance provided by the plunger 150, which would be designed similar to the adjustment means discussed with respect to the plunger 50.

Referring further to FIG. 5, the plunger 50 and the cam member 70 are in an interacting position. Even though the plunger 50 and the cam member 70 are in an interacting position, there is still a gap therbetween the adjustment bar 31 and the plunger 50. This can be referred to an override position, when either the handle is not being twisted, or the maximum force limit has been delivered by the handle to the cam member 70. An engaged position would be considered when the plunger 150 and the plunger 50 makes direct contact with the cam member 70 when the driver 5 is in use, as shown and described with respect to FIGS. 17-21. Direct contact occurs when the driver 5 is actually being used and torque is being delivered to the driver 5. The free gap is an important feature of the present invention. The free gap prevents the plunger 50 from being subjected to a large amount of force when the driver 5 has been subjected to a maximum amount of torque and returns to a resting or override position. The driver 5 may also be designed so that the cam member 70 and the plunger 50 form a free gap instead of between the plunger 50 and the adjustment bar 31, similar to that shown with respect to the plunger 150 and the cam member 70. Either of these designs would fall within the scope of the present invention.

Figure 6:
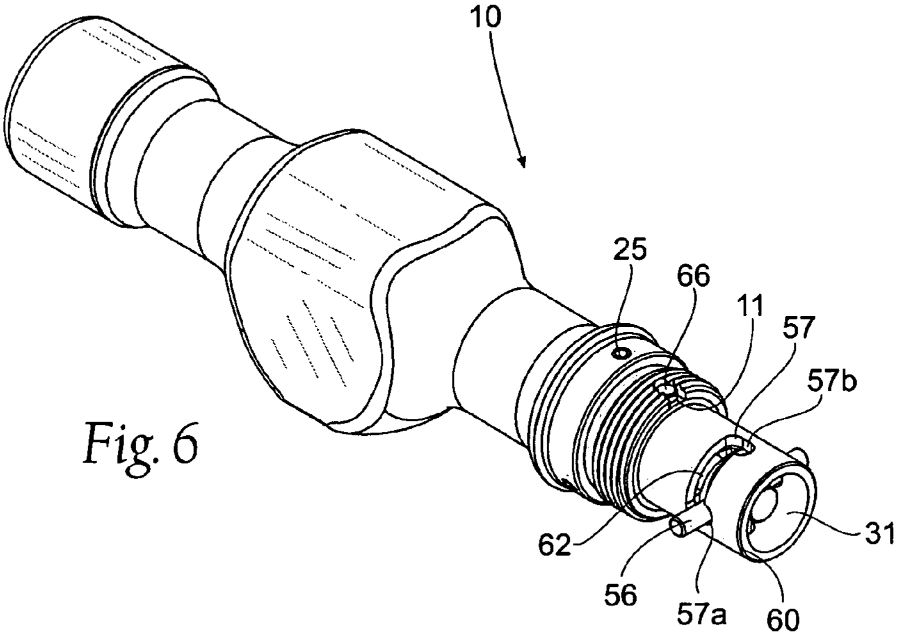
FIG. 6 is a perspective view of a handle used in accordance with the present invention, with part of the handle being removed.

FIG. 6 shows a perspective view of the handle 10 with the adjustment knob 100 removed. As previously noted, the set screws 25 are used to secure the adjusting screw 67 (FIG. 3) in place. The locking pin 66 is inserted within a slot 11 to secure the locking mechanism 60 to the handle 10. The pin 56 is attached to the adjusting bar 31 and resides within a guide slot 62 that has a first notch 57*a* and a second notch 57*b*. The notches 57*a*, 57*b* are related to the first position and second position for the plunger 50 to interact or not interact with the cam member 70, as discussed with respect to FIGS. 3 and 4. That is, when the locking pin 56 is in the notch 57*a*, the arrangement will be as shown in FIG. 3, and when the locking pin is in notch 57*b*, the arrangement will be as shown in FIG. 4. Rotating the knob 100 (FIGS. 3 and 4) moves the pin 56 along the guide slot 62, with the various springs of the driver biasing the pin into a notch 57*a* or 57*b* when reached.

Figure 7:
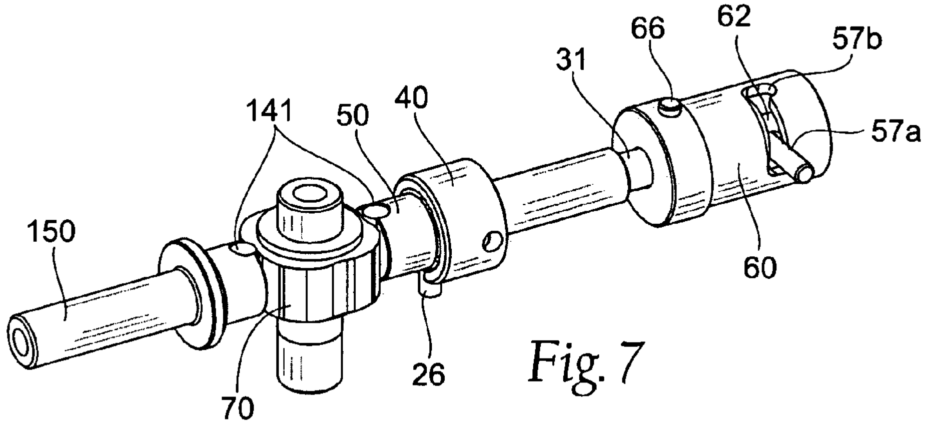
FIG. 7 is a perspective view of the interior of the handle shown in FIG. 6.
Figure 8:
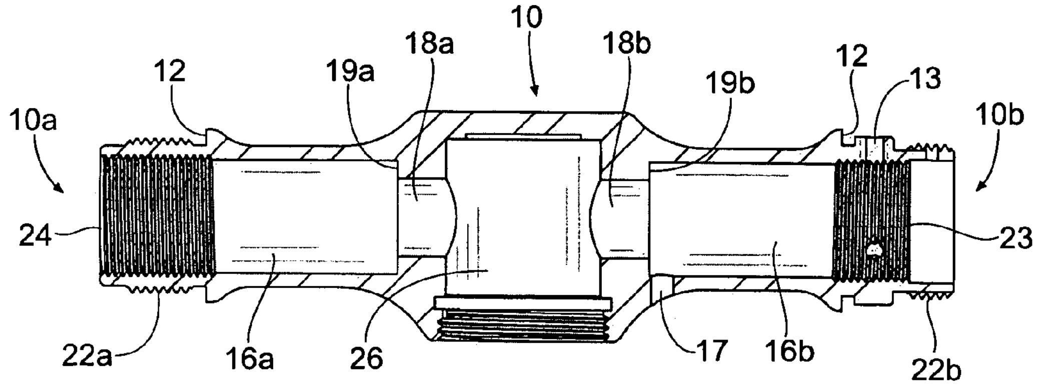
FIG. 8 is a cross-sectional view of the handle of FIG. 6.

Referring to FIG. 7, the plungers 150, 50, and 40, along with the cam member 70, are shown outside of the handle 10 as they would be arranged within the handle 10. As previously noted, rolling members 141 reside between the plungers 150 and 50 and the cam member 70. The rolling members 141 are centrally and axially aligned with a longitudinal axis of the cam member 70 and a respective face of the cam member 70. The arrangement of FIG. 7 fits within the handle 10, shown in FIG. 8, which houses various elements of the assembly. The first end 10*a* forms a first housing 16*a* for the plunger 150, the second end 10*b* forms a second housing 16*b* for the plunger 40, and the intermediate area forms a housing 26 for the cam member 70 and the bearings 91*a*, 91*b* (see FIGS. 3 and 4). The plungers 150 and 40 are biased against a respective face 19*a* and 19*b*, to control and regulate the movement of the plungers 50, 150. These biased arrangements are particularly designed to provides the free gap previously described for the plungers 50, 150 and the cam member 70. As previously mentioned, the plunger 40 and the adjustment bar 31 work together, which allows the adjustment bar 31 to be properly biased, as well. When inserted into the handle, the plungers 150 and 50 and the rollers 141 will be seated within the respective passageways, 18*a* and 18*b*. Once the various elements are inserted within the handle 10, the caps 94 and 95 (see FIG. 3) are threaded onto threaded portions 24 and 23, respectively, until they are secure against faces 12. Thus, the handle is designed and arranged for precisely arranged parts that will interact in a consistent and accurate manner when the tool is in use.

Referring further to FIG. 7, the plunger 50 and the adjustment bar 31 are preferably designed as separate pieces. The rolling member 141 needs to be axially aligned with the surface of the cam member 70. If the adjustment bar 31 is turned 90°, such as would be the case when moving from the first position in FIG. 3 to the second position in FIG. 4, the rolling member 141 must still be properly aligned with the cam member 70. Thus, the adjustment bar 31 preferably will move independently of the plunger 50, so that the rolling member 141 will stay centrally aligned with the cam member 70. However, it is understood that other shapes and designs for rolling members, such as spheres, or a curved surface of the plunger 50, may be used or incorporated into the present invention that would allow the plunger 50 and the bar 31 to be designed as a single piece, and still fall within the scope of the present invention. Provided that the proper alignment and spacing of the rolling member 141 and the cam member 70 is incorporated, as discussed with respect to FIG. 5, the design would fall within the scope of the present invention.

Figure 9:
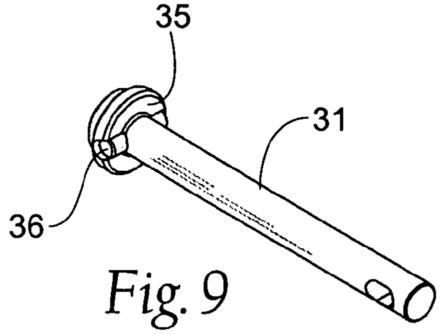
FIGS. 9 and 10 provide perspective views of a torque adjustment device used in the present invention.
Figure 10:
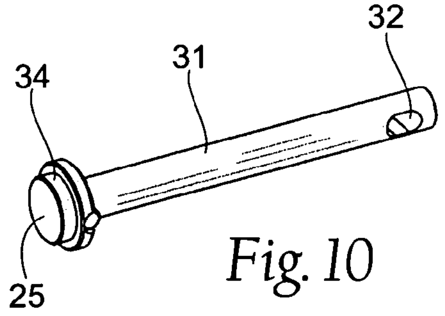

FIGS. 9 and 10 provide perspective views of the adjustment bar 31 used in the present invention. As discussed with respect to FIG. 3, the bar 31 interacts with the plunger 50 when the adjustment bar 31 is moved to a second engaged position. The flat face 25 is designed to be laterally and axially aligned with the plunger 50. A pin 36 located near the face 35 allows the bar 31 to engage the plunger 40 (FIGS. 3 and 4), and a slot 32 located on the bar 31 allows the bar 31 to be attached to the pin 56 (see FIGS. 3, 4, and 7). The pin 36 is tightly compressed within the adjustment bar 31.

Figure 11:
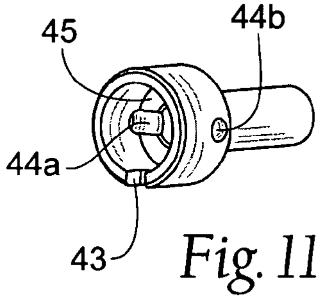
FIG. 11 is a perspective view of a plunger device used in the present invention.

FIG. 11 provides a perspective view of the plunger 40. As stated above, the adjustment bar 31 works with the plunger 40. The plunger 40 receives the pin 26 (see FIG. 3) within the slot 43 to keep the plunger 40 stationary. When the driver 5 is in an inactive or first position (FIG. 3), the face 35 (FIG. 9) will abut the internal surface 45 of the plunger 40. When the adjustment bar 31 is rotated 90° into the second position (FIG. 4), the pin 36 will engage the internal surface 45 of the plunger 40. Thus, the rotation of the adjustment bar 31 allows either the face 35 of the bar 31 or the pin 36 to engage the internal surface 45, which relates to the plunger 40 being engaged with the plunger 50 or not. The openings 44*a*, 44*b* in the plunger 40 provide an easier arrangement to properly machine or form the internal surface 45 of the plunger 40 for proper engagement of the plunger 40 and the bar 31.

Figure 12:
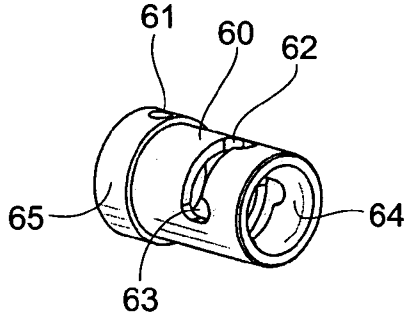
FIG. 12 is perspective view of a locking assembly used in the present invention.

FIG. 12 shows a perspective view of the locking mechanism 60. As noted with respect to FIG. 7, the guide slot 62 allows the pin 56 (FIG. 7) specifically, and the overall assembly 5, generally, to move from a first position 57*a* (FIG. 3) to a second position 57*b* (FIG. 4). A hole 61 located on the mechanism 60 receives a pin (FIGS. 3 and 7) to further secure the locking mechanism 60 within the handle 10. The mechanism 60 has an inner diameter 64 sized to receive the spring 111 (see FIG. 3) and an outer diameter 65 to properly align and space the mechanism 60 within the housing section 16*b* (see FIG. 8).

Figure 13:
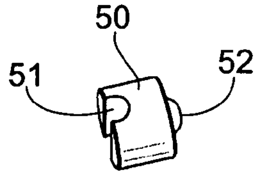
FIG. 13 is a perspective view of a second plunger device used in the present invention.

FIG. 13 provides a perspective view of the plunger 50, which, as stated before, is designed similarly as the plunger 150 for interaction with the cam member 70. A notched area 51 will receive a rolling member 141, as previously discussed with respect to FIG. 5. A nipple 52 located opposite of the notched area 51 is arranged so that it is capable of interaction with the face 35 of the adjustment bar 31. Preferably, the nipple 52 is centrally and laterally aligned with the face 35, thereby minimizing any competing directional or translational forces. This minimizes wear on the overall assembly, which leads to a longer, useful life of the assembly when compared to the prior art.

Figure 14:
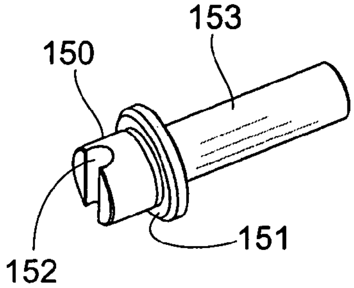
FIG. 14 is a perspective view of a further plunger device used in the present invention.

FIG. 14 shows a perspective view of the plunger 150. As previously noted, the plunger 150 includes a notched out area 152 that receives the rolling member 141 (see FIG. 5). The rolling member 141 and the notched area 152 are preferably arranged so that the plunger 150 will be centrally aligned with the cam member 70. The outside diameter 153 of the plunger 150 is sized to receive the spring 112 (FIG. 3). Also, the face 151 of the plunger will abut the face 19*a* to provide the proper biasing means for the plunger 150 against the handle 10 (FIG. 3).

Figure 15:
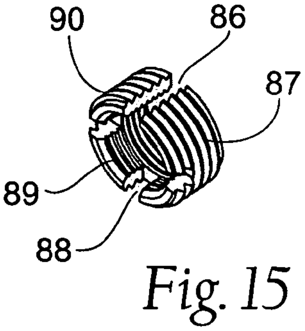
FIG. 15 is a perspective view of a locking screw used in the present invention.

FIG. 15 provides a perspective view of the locking screw 85. The locking screw 85 has an internal threaded area 89 for engagement with the plug 90 (FIG. 3), and an external threaded portion 87 for engagement with the cap 94 (FIG. 3). Slots 88 and a split area 86 further provide proper spacing for the screw 85, which assists in proper retention of the plunger 150, as previously discussed. The split area 86 extends longitudinally the entire length of the screw 85, which is an improvement over the prior art. When inserted into the handle, a tool, such as a wrench, will be inserted into the slot 88 to hold the locking screw 85 in place. When the plug 90 is tightened, the split 86 allows the screw 85 to expand, thereby accomplishing the locking feature of the screw 85. Prior art screws did not have a split area 86 that extended the full longitudinal length of the screw 85. Consequently, these screws could not form as tight and secure fitting relationship as in the present invention.

Figure 16:
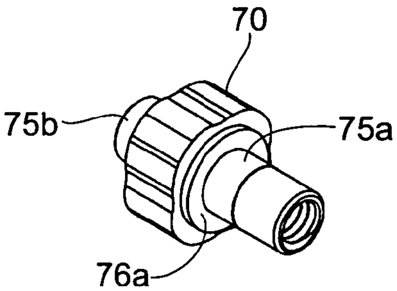
FIG. 16 is a perspective view of a cam member used in the present invention.

FIG. 16 provides a perspective view of the cam member 70. The cam member 70 has a central axis or shaft having opposing ends 75*a* and 75*b*, which receive the bearings 91*a* and 91*b*, respectively (see FIG. 2). The bearings 91*a* and 91*b* securely fit upon the ends 75*a* and 75*b* to insure that the cam member 70 is properly axially aligned and substantially perpendicular to the plungers 150 and 50. This helps to insure that an exerted twisting force in the handle 10 is properly and efficiently translated to the downward toque needed to use the assembly to drive a tool. Similarly, as previously noted for the plungers 50 and 150, the properly axially aligned relationship minimizes wear and tear on the specific elements, thereby extending the useful life of the assembly 5.

Figure 17:
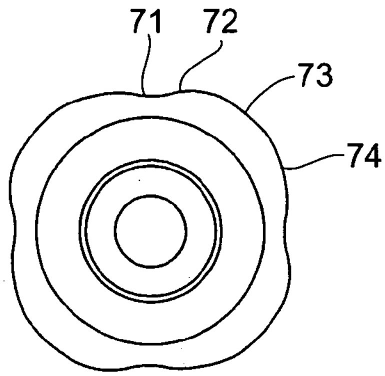
FIGS. 17-20 provide various front elevation views of the cam member of FIG. 16 having various cam surfaces interacting with a plunger used in accordance with present invention.
Figure 18:
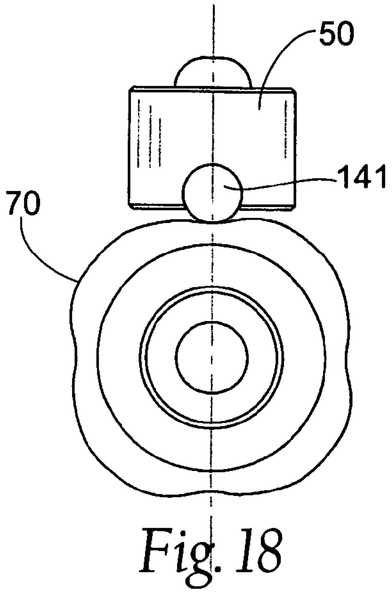
Figure 19:
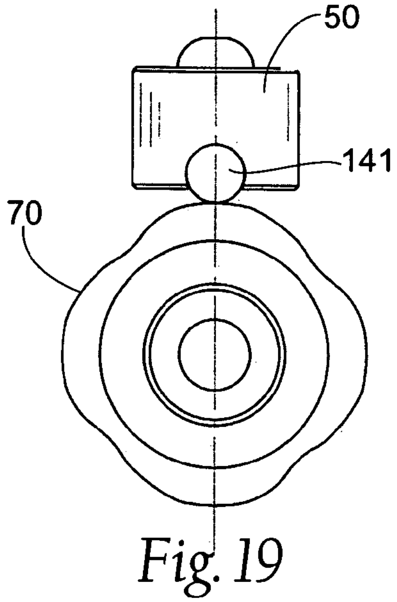
Figure 20:
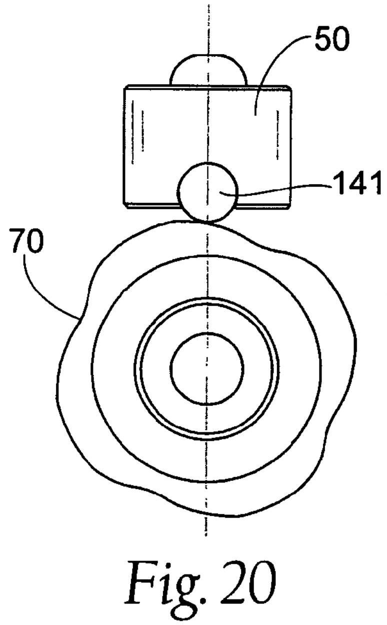

FIGS. 17-20 provide various views of the cam member 70 interacting with the plunger 50. As shown in FIG. 17, the surface of the cam member 70 is designed so that the rolling member 141 will glide along the surface without unnecessary force exerted on the rolling member 141, which can lead to damage and wear on the rolling members 141. The curvilinear face is preferably symmetrical, with a plurality of inclined areas 71 interposed between gradual sloped areas 72 and 74 that culminate in the elevated areas 73, which contribute to the reduction of unnecessary force on the rolling members 141. The general principle for the cam member 70 is that the rolling member 141 will roll slowly up and down the surfaces 72 and 74 when a maximum torque or pressure limit is reached. Because the various elements of the assembly 5 are precisely interconnected, the need for sharp, rigid sloped surfaces of prior art devices, such as pawl-like devices, is not required. The plunger 50 and the interaction with the cam member 70 is shown as exemplary in the drawings. However, it is understood that the discussed principles will relate to the plunger 150, as well.

Figure 21:
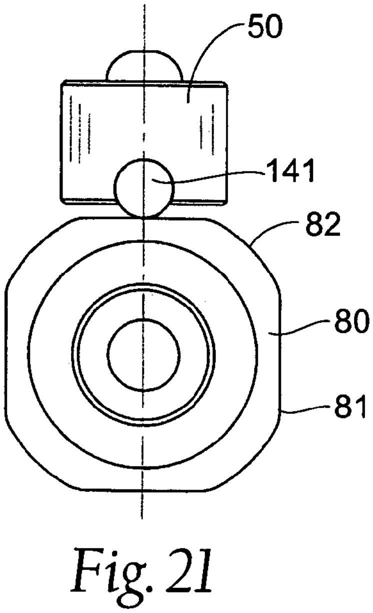
FIG. 21 provides an alternate embodiment of a cam member used in accordance with the present invention.

FIG. 21 provides an alternate cam member 80. The principles of using gradual slopes are similar to those shown for the cam member 70. The curvilinear surface of the cam member 80 is comprised of a plurality of flats 80 interposed between curved areas 82, which provide the gradual slope as discussed with respect to the cam member 70 and surfaces 72 and 74. Thus, it is understood that the arrangement of the cam of the present invention may be embodied in different arrangements while still falling within the scope of the present invention.

Figure 22:
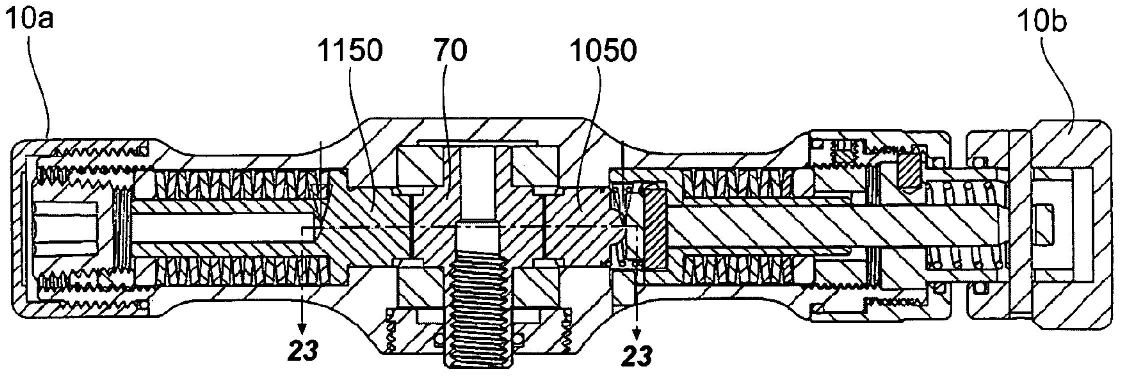
FIG. 22 is a cross-sectional view of a handle according to the present invention, including an alternate rolling member arrangement.
Figure 23:
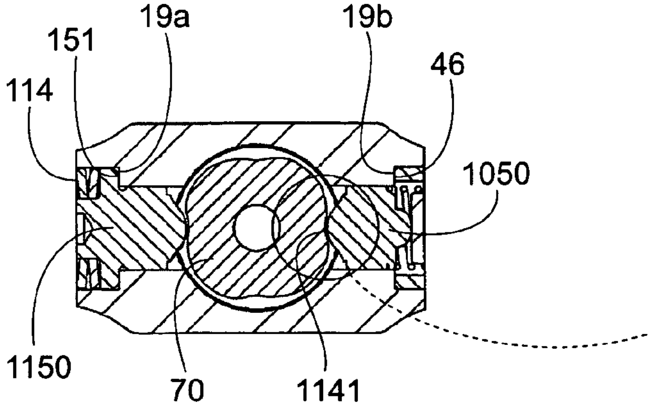
FIG. 23 is a cross-sectional view of the handle of FIG. 22 taken along the line 23-23 of FIG. 22.
Figure 24:
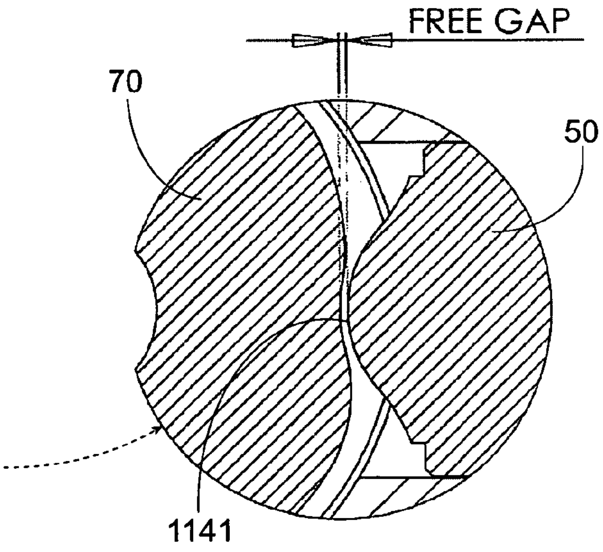
FIG. 24 is a close-up view of the area included in the circle in FIG. 23.

FIG. 22 provides the handle 10 having an alternate plunger arrangement. A plunger 1150 sits within the first end 10*a* of the handle 10, and a second plunger 1050 sits within the second end 10*b* of the handle 10. The principle of interaction with the cam member 70 of the plungers 1150 and 1050 is the same as previously discussed with the plungers 150 and 50, respectively. However, as shown more closely with respect to FIGS. 23 and 24, the plungers 1150 and 1050 have a rolling member 1141 directly incorporated into the plungers 1150, 1050. As with the previously described plungers 150, 50 and the rolling members 141, free gaps located between the rolling members 1141 and the cam member 70 minimize wear and tear on the device 5.

Figure 25:
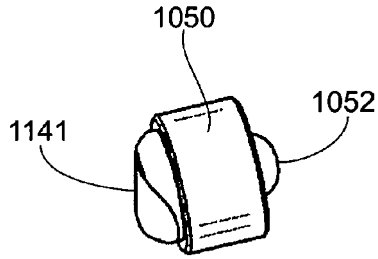
FIG. 25 is an alternate plunger member used with the arrangement of FIG. 22.

FIG. 25 provides a perspective view of the plunger 1050. The rolling member 1141 is aligned to interact with cam member 70 when in the second position previously described. The nipple 1052 is centrally and axially aligned for accurate interaction with the plunger 40, as previously describer with the previous embodiment.

Figure 26:
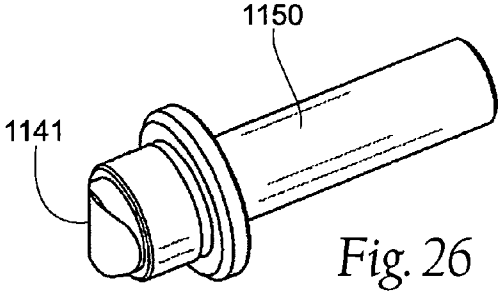
FIG. 26 is a second plunger member used with the arrangement of FIG. 22.

FIG. 26 provides a perspective view of the plunger 1150. The rolling member 1141 is designed to interact with the cam member 70, as is the previously described plunger 150 and rolling member 141.

Figure 27:
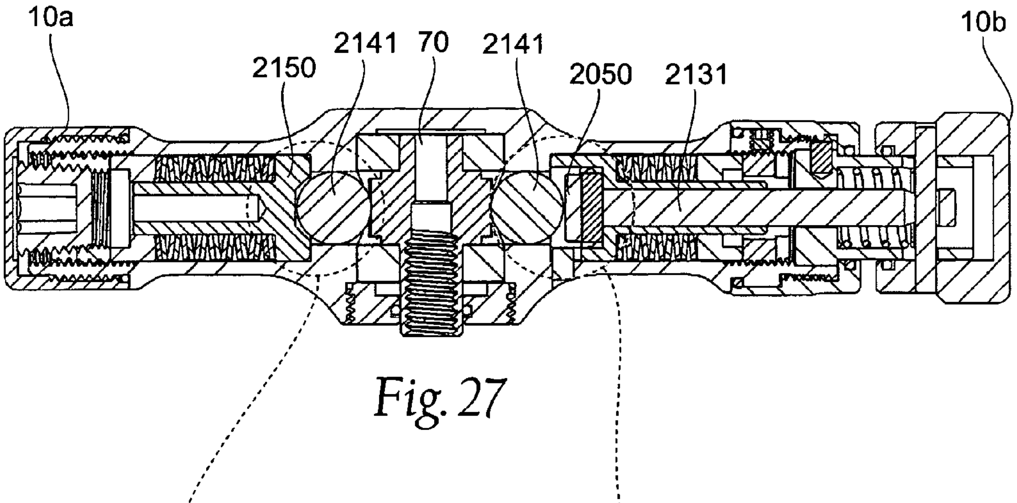
FIG. 27 is a cross-sectional view of a handle according to the present invention, including a further alternate rolling member arrangement.
Figure 28:
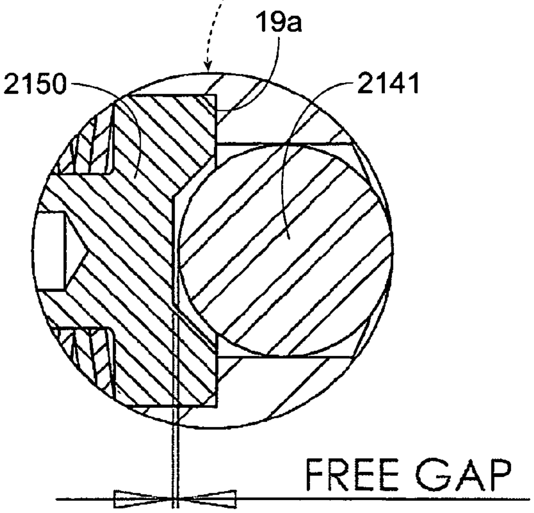
FIG. 28 is a close-up sectional view of an area of the handle of FIG. 27.
Figure 29:
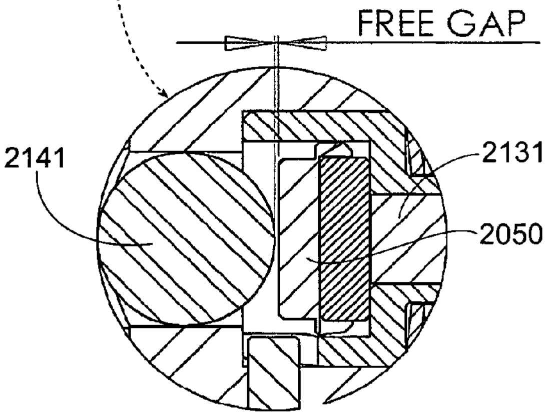
FIG. 29 is a close-up sectional view of an area of the handle of FIG. 27.

FIG. 27 provides yet another arrangement of the handle 10. A pair of rolling members 2141 is located between the cam member 70 and a respective plunger 2150 and 2050. The rolling member 2141 is designed as a spherical ball. As shown in FIG. 28, the plunger 2150 has a face 2151 that abuts the surface 19*a* of the handle 10, to properly bias the plunger 2150 and provide the necessary free gap between the rolling member 2141 and the plunger 2150.

FIG. 28 provides an engaged position, or second position, for the plunger 2050 and the rolling member 2141. The face of the plunger 2050 is designed to be axially aligned with the rolling member 2141 and, also, the cam member 70. There is also the necessary free gap between the plunger 2050 and the rolling member 2141. The plunger 2050 also acts as adjustment means or adjustment bar 2131 for the handle 10, similarly to the adjustment bar 31 (see FIG. 4) of the previous embodiments. Thus, it is understood that the present invention encompasses either arrangement.

Figure 30:
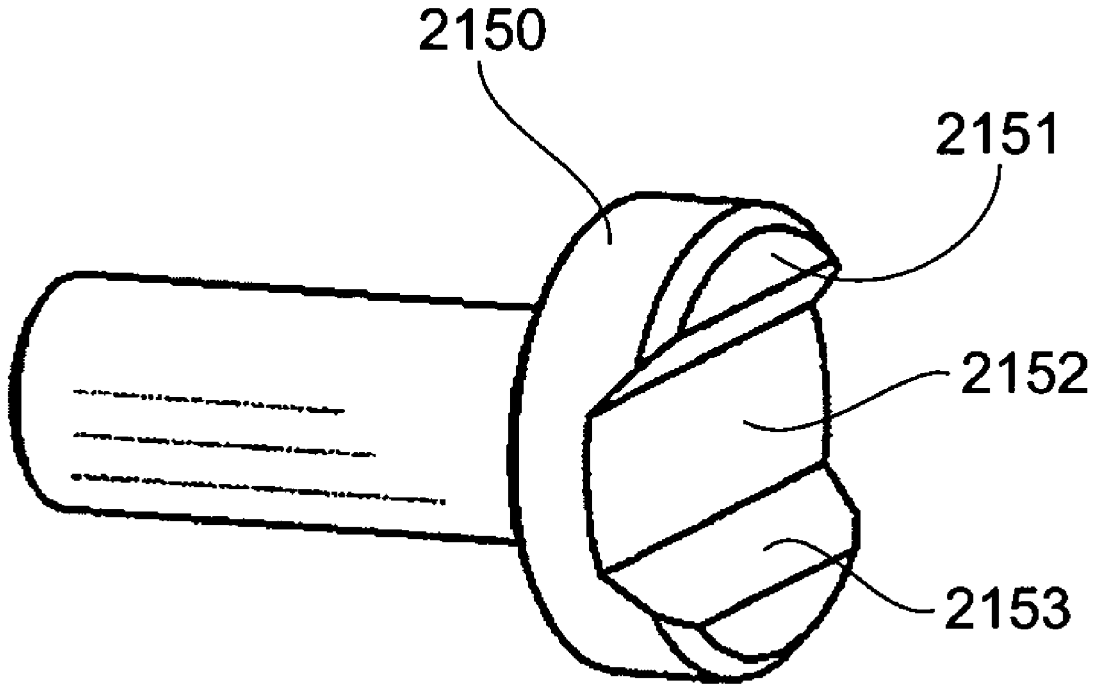
FIG. 30 is a further plunger member used with the arrangement of FIG. 27.

FIG. 30 provides a perspective view of the plunger 2150. The plunger has faces 2151 and 2153 for biasing against the handle 10. A face 52 is designed to engage the rolling member 2141, as previously shown, to allow easy and smooth interaction while minimizing wear and tear of the rolling member 2141. FIG. 30 demonstrates that different plunger designs may be used in the present invention and still fall within the scope of the present invention.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. An adjustable, torque-limiting driver for a tool, said driver comprising:

a radially extending handle comprising a housing, said housing having a first end, a second end, and an intermediate area;

a cam member located in said intermediate area, said cam member having a curvilinear surface, said cam member being movable between an engaged position and an override position;

a first plunger member located in said first end of said housing;

a first biasing means for biasing said first plunger member against said housing;

a first rolling member located between said first plunger member and said cam member, said first rolling member being in contact with said cam member when said cam member is in said engaged position, said first rolling member and said cam member forming a gap therebetween when said cam member is in said override position;

a second plunger member located in said second end of said housing, said second plunger member being movable from a first position to a second position;

means for adjusting said second plunger member, said adjustment means and said second plunger forming a gap therebetween when said cam member is in said override position;

a second biasing means for biasing said second plunger member against said housing when said second plunger member is in said second position;

a second rolling member located between said second plunger member and said cam member, said second rolling member being in contact with said cam member when said cam member is in said engaged position and when said second rolling member is in said second position; and means for connecting said cam member to the tool.

2. The driver according to claim 1, wherein at least one of said first and said second rolling members is a cylindrical-shaped member, said cylindrical-shaped member fittingly engaged within a hollowed area of a respective plunger.

3. The driver according to claim 1, wherein at least one of said first and said second rolling members is sphere-shaped and located between a respective plunger and said cam member.

4. The driver according to claim 1, wherein at least one of said plungers comprises a curvilinear surface, said curvilinear surface comprising a respective rolling member.

5. The driver according to claim 1, wherein said adjusting means further comprises:

an adjustment knob; and a shaft coupled to said adjustment knob, said shaft interacting with said second plunger member when said second plunger is in said second position, said shaft and said second plunger member forming a gap with said second plunger when said second plunger is in said second position.

6. The driver according to claim 5, further comprising:

a third hollow plunger biased against said housing, said third plunger comprising an internal surface;

said shaft further comprising a face, said shaft being seated within said third plunger, said face of said shaft abutting said internal surface of said third plunger when said second plunger is in said first position, said face of said shaft engaging said internal surface of said third plunger when said second plunger is in said second position.

7. The driver according to claim 6, wherein said shaft and said second plunger are axially aligned.

8. The driver according to claim 1, wherein said rolling members are axially and centrally aligned with said cam member.

9. The driver according to claim 1 further comprising a pair of bearings located on opposing vertical sides of said cam member, whereby bearings keep the cam member substantially perpendicular to said handle.

10. The driver according to claim 1 further comprising:

a plug located in said first end; and a locking screw located in said first end for retaining said first plunger in said first end, said plug engaging locking screw to secure said locking screw in said first end, said locking screw comprising a split area longitudinally extending the length of said locking screw.

11. An adjustable, torque-limiting driver comprising:

a radially extending handle comprising a housing, said housing having a first end, a second end, and an intermediate area;

a cam member located in said intermediate area, said cam member having a curvilinear surfaces, said cam member being movable between an engaged position and an override position;

a first plunger member located in said first end of said housing;

a first biasing means for biasing said first plunger against said housing;

a first rolling member located between said first plunger member and said cam member, said first rolling member being in contact with said cam member when said cam member is in said engaged position, said first rolling member and said cam member forming a gap therebetween when said cam member is in said override position;

a second plunger member located in said second end of said housing, said second plunger being movable from a first position to a second position;

means for adjusting said second plunger from said first position to said second position;

a second biasing means for biasing said second plunger member against said housing when said second plunger member is in said second position;

a second rolling member located between said second plunger member and said cam member, said second rolling member being in contact with said cam member when in said engaged position and when said second rolling member is in said second position, said cam member and said second plunger forming a gap therebetween when said cam member is in said override position and said second plunger is in said second position; and means for connecting said cam member to said tool.

12. The driver according to claim 11, wherein at least one of said first and said second rolling members is a cylindrical-shaped member, said cylindrical-shaped member fittingly engaged within a hollowed area of a respective plunger.

13. The driver according to claim 11, wherein at least one of said first and said second rolling members is sphere-shaped and located between a respective plunger and said cam member.

14. The driver according to claim 11, wherein at least one of said plungers comprises a curvilinear surface, said curvilinear surface comprising a respective rolling member.

15. The driver according to claim 11, wherein said adjusting means further comprises:

an adjustment knob; and a shaft coupled to said adjustment knob, said shaft interacting with said second plunger member when said second plunger is in said active contact position.

16. The driver according to claim 15, further comprising:

a third hollow plunger biased against said housing, said third plunger comprising an internal surface;

said shaft further comprising a face, said shaft being seated within said third plunger, said face of said shaft abutting said internal surface of said third plunger when said second plunger is in said first position, said face of said shaft engaging said internal surface of said third plunger when said second plunger is in said second position.

17. The driver according to claim 11 further comprising a pair of bearings located on opposing vertical sides of said cam member, whereby bearings maintain the cam member substantially perpendicular to said handle.

18. An adjustable, torque-limiting driver for a tool, said driver comprising:

a radially extending handle comprising a housing, said housing having a first end, a second end, and an intermediate area;

a cam member located in said intermediate area, said cam member having a curvilinear surface, said cam member being movable between an engaged position and an override position;

a first plunger member secured within said first end of said housing;

a first biasing means for biasing said first plunger member against said housing;

a first rolling member located between said first plunger member and said cam member, said first rolling member being in contact with said cam member when said cam member is in said engaged position, said first rolling member and said cam member forming a gap therebetween when said cam member is in said override position;

a second plunger member located in said second end of said housing, said second plunger member being movable from a first position to a second position;

means for adjusting said second plunger member from said first position to said second position, said adjustment means and said second plunger forming a gap therebetween when said cam member is in said override position, said adjustment means comprising a shaft;

a second biasing means for biasing said second plunger member against said housing when said second plunger member is in said second position;

a second rolling member located between said second plunger member and said cam member, said second rolling member being in contact with said cam member when said cam member is in said engaged position and when said second rolling member is in said second position;

a third plunger located in said first end of said handle and biased against said housing, said shaft being seated within said third plunger, said shaft engaging said third plunger when said second plunger is in said second position; and means for connecting said cam member to the tool.

19. The driver according to claim 18 wherein said rolling members are centrally aligned with the surface of said cam member.

20. The driver according to claim 18 further comprising a pair of bearings located on opposing vertical sides of said cam member, whereby said bearings maintain the cam member substantially perpendicular to said handle.

* * * * *